(12) United States Patent
Sabatini

(10) Patent No.: US 6,733,560 B1
(45) Date of Patent: May 11, 2004

(54) WATER SOLUBLE COMPLEX FERTILIZERS, METHOD FOR THEIR PREPARATION AND RELATED USE

(75) Inventor: Nicola Sabatini, Chieti (IT)

(73) Assignee: S.I.S.O. Societá Industria Sequestranti Organici Srl, Milan (IT)

( * ) Notice: Subject to any disclaimer, the term of this patent is extended or adjusted under 35 U.S.C. 154(b) by 114 days.

(21) Appl. No.: 09/869,525

(22) PCT Filed: Oct. 24, 2000

(86) PCT No.: PCT/IT00/00428
§ 371 (c)(1),
(2), (4) Date: Jun. 29, 2001

(87) PCT Pub. No.: WO01/30724
PCT Pub. Date: May 3, 2001

(30) Foreign Application Priority Data

Oct. 29, 1999 (IT) ......................................... RM99A0671

(51) Int. Cl.$^7$ .................................................. C05G 1/00
(52) U.S. Cl. ...................... 71/31; 71/32; 71/33; 71/34; 71/59; 71/61; 71/61.03
(58) Field of Search ................................. 71/31, 32, 33, 71/34, 59, 61, 64.03

(56) References Cited

U.S. PATENT DOCUMENTS

| | | | | | |
|---|---|---|---|---|---|
| 1,788,828 | A | * | 1/1931 | Goldberg et al. | 71/35 |
| 3,049,416 | A | * | 8/1962 | Brown et al. | 71/37 |
| 3,049,418 | A | * | 8/1962 | Brown et al. | 71/39 |
| 3,323,863 | A | * | 6/1967 | Seymour et al. | 23/107 |
| 3,475,153 | A | * | 10/1969 | Abbott et al. | 71/35 |

FOREIGN PATENT DOCUMENTS

FR 2519626 * 7/1983

\* cited by examiner

*Primary Examiner*—C. Sayala
(74) *Attorney, Agent, or Firm*—Browdy and Neimark, P.L.LC.

(57) ABSTRACT

The present invention relates to a method for the preparation of a complex NPK fertilizer in the form of granules or prills, and to a method for its preparation and to the related use of the fertilizer thereby obtained. In particular the present invention relates to a fertilizer containing as fertilizing elements Nitrogen N, Phosphor P, Potassium K, meso elements like Calcium Ca, Magnesium Mg, Sulphur S, and micro elements like Iron Fe, Manganese Mn, Zinc Zn, Copper Cu, Boron B and Molybdenum Mo.

23 Claims, 1 Drawing Sheet

US 6,733,560 B1

WATER SOLUBLE COMPLEX FERTILIZERS, METHOD FOR THEIR PREPARATION AND RELATED USE

REFERENCE TO RELATED APPLICATIONS

Figure 1:
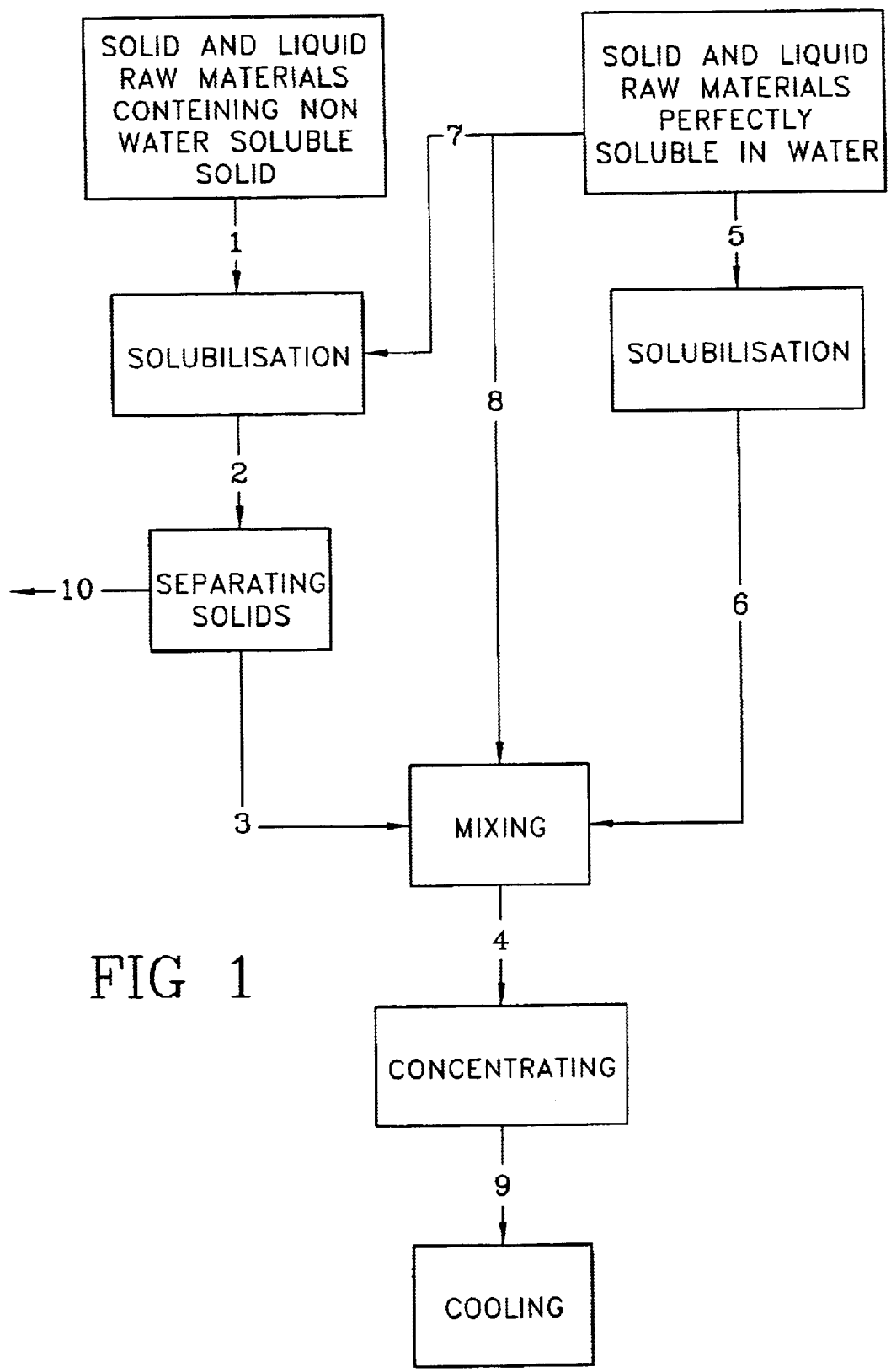

The present application is the national stage under 35 U.S.C. 371 of international application PCT/IT00/00428, filed 24 Oct. 1999 which designated the United States, and which international application was published under PCT Article 21(2) in the English language.

TECHNICAL FIELD

The present invention relates to a complex NPK fertiliser in the form of granules or prills, and to a method for its preparation and to the related use of the fertiliser thereby obtained. In particular, the present invention relates to a fertiliser containing as fertilising elements Nitrogen N, Phosphor P, Potassium K, meso elements like Calcium Ca, Magnesium Mg, Sulphur S, and micro elements like Iron Fe, Manganese Mn, Zinc Zn, Copper Cu, Boron B and Molybdenum Mo.

BACKGROUND ART

Complex NPK fertilisers containing meso and micro elements are known in the trade. These types of fertilisers are obtained by etching phosphatic rocks with sulphuric, nitric or phosphoric acid with the subsequent ammonification and addition of Potassium in the form of potassium sulphate or potassium chloride to obtain a suspension or pulp. The solution or pulp is then transformed into solid particles shaped as granules or prills, by means of granulating processes or through the prilling of the molten salts. Although these kinds of fertilisers contain in full or in part the nutrients necessary for crops, they are not free of disadvantages. One disadvantage is that of not being perfectly water soluble due to the presence of the residues deriving from the etching of the phosphatic rocks, i.e. if solubilised they leave an insoluble residue. The direct application of the solution of complex NPK fertilisers thereby obtained causes the blockage of distribution systems in fertilisation-irrigation, leaf fertilisation, and hydroponic fertilisation systems.

There are patents that relate to the production of water soluble complex NPK fertilisers that contain meso and micro elements.

All such methods provide for obtaining a solution of molten salts containing N, generally $NH_4\ NO_3$, with the subsequent addition of solid salts containing P such as $NH_4H_2PO_4$ or $(NH_4)_2HPO_4$ and/or K such as $K_2SO_4$ and KCl. The limitation for these methods consists of the fact that the added phosphatic and/or potassic salts are in solid form and can give rise to a suspension, leading to problems of inconsistency in the molten solution in addition to high viscosity levels, which as is well known prevent the perfect homogenisation of the solution.

It is known that the production of highly soluble complex NPK fertilisers available on the market is carried out by mixing the various sources of N, P, K, perfectly soluble meso and micro elements, after grinding the components to obtain a uniform grain size. This common practice presents two disadvantages. The first disadvantage is that the product thereby obtained contains dusts due to the grinding, creating problems in any direct application. The second disadvantage is that of having to mix together components having different density with the consequent problems of component segregation during the preparation, transport, storage of the sacks and during the mechanical distribution on the soil.

Also commercially available are products which do not present segregation or dustiness problems, both in the form of granules, prills or crystals which are perfectly water soluble, but bring to the crops only two nutrients among N, P, and K and at times meso and micro elements. I.e., NP, KP, and NK fertilisers are available.

It is also well known that all fertilisers have the tendency to become compacted due to the irregularity of the particles, lack of homogeneity of the particles, and residual humidity.

Disclosure of Invention

One of the aims of the present invention is to provide a method which allows to obtain a water soluble complex NPK fertiliser in granules or prills, highly soluble in water, which may contain meso and micro elements and has perfectly predictable composition characteristics since each granule or prill derives from a solution with homogeneous composition.

Another aim of the proposed method is to provide a water soluble complex NPK fertiliser in granules or prills, which does not present segregation phenomena during the preparation, transport or storage of the sacks and in the course of mechanical distribution on the soil, and which contains no dust.

Yet another aim of the proposed method is to provide a water soluble complex NPK fertiliser in granules or prills which can be used in localised fertilisation-irrigation or in widespread fertilisation-irrigation, leaf fertilisation, hydroponic fertilisation, or usable also when the immediate availability of nutrients is required, but no specific application device is available and the product is distributed on the soil, with subsequent irrigation by traditional methods.

A further aim of the method proposed by the present invention is to provide a water soluble complex NPK fertiliser in granules or prills, having such composition and homogeneity characteristics as to provide it with greater resistance against compacting.

DESCRIPTION OF THE ILLUSTRATIVE EMBODIMENT

These aims and others beside have been achieved by the Applicant which has found it useful to prepare a water soluble complex NPK fertiliser in the form of granules of prills by means of a method which comprises the following phases:

a) solubilisation in water of salts containing the fertilising elements of Nitrogen, Phosphor, and Potassium to form a solution, said solution comprising a fraction of non soluble solids in suspension;

b) separation from the solution obtained during phase a) of the fraction of non soluble solids in suspension, thus obtaining a solution free of solids in suspension;

c) concentrating the solution free of solids in suspension obtained from phase b) until obtaining a solution; and d) cooling the solution obtained from phase c) until obtaining granules or prills. The method consists of the solubilisation in water, during phase a), of salts containing the fertilising elements N, for instance in the form of ammonium nitrate ($NH_4NO_3$), Phosphor, for instance in the form of mono-ammonium phosphate ($NH_4H_2PO_4$) and Potassium, for instance in the form of potassium nitrate $KNO_3$.

From said solution is separated, during phase b), the fraction of the non soluble solids in suspension, thereby obtaining a solution without solids in suspension. Preferably said solution without solids in suspension contains no more than 80% of water weight. Possibly, to obtain the required composition, to the solution can be added other fertilising elements N, P, K and nutrients (meso and micro elements) such as S, Ca, Mg, Fe, Mn, Zn, Cu, B, Mo contained in water soluble salts.

The solution is concentrated by means of heating, during phase c), until obtaining a solution of molten salts. Preferably said solution of molten salts has a maximum water content of 5% by weight. The molten salt solution thereby obtained is then cooled, during phase d), in such a way as to obtain granules or prills having a size smaller than 7 mm; preferably smaller than 4 mm.

The method of the present invention allows to obtain a complex NPK fertiliser in the form of granules or prills having a solubility in water of at least 90% by weight; preferably at least 95% by weight; yet more preferably, at least 99% by weight The complex NPK fertilisers of the present invention present the advantage of having pronounced anti-compacting characteristics. Moreover, the complex NPK fertilisers of the present invention are free of dusts.

The complex NPK fertilisers of the present invention can be used in applications of localised fertilisation-irrigation or widespread fertilisation-irrigation, leaf fertilisation, hydroponic fertilisation, or can be used also when the immediate availability of nutrients is required but no specific application device is available and the product is distributed on the soil, with subsequent irrigation by traditional methods.

Some preferred embodiments of the method according to the present invention are described below with reference to the flow chart shown in FIG. 1.

Said preferred embodiments are provided by way of non limiting examples and they are as follows:

A) the raw materials containing non water soluble solids 1 are dissolved in water with all raw materials which are perfectly soluble in water 7 until the required ratios are obtained. Subsequently, the resulting solution 2 is separated in two fractions, obtaining the resulting clear solution 3 and the insoluble body 10.

If integrations to the formulation are required, they are carried out when mixing between the flows 3 and 8; if no integration is required, the homogenisation (mixing) phase can be eliminated, directly obtaining flow 4 from flow 3.

B) The raw materials containing non water soluble solids 1 are dissolved in water separately from the perfectly water soluble raw materials 5. The resulting solution 2 is separated in two fractions, obtaining the resulting clear solution 3 and the insoluble body 10. The flows 3 and 6 are mixed. If necessary, during this phase the formulation is integrated by means of the flow 8. The current 4 is thereby obtained at the output.

C) The raw materials containing non water soluble solids 1 are dissolved in water together with some of the water soluble raw materials 7. Subsequently, the resulting solution is separated in two factions, obtaining the clear solution 3 and the insoluble body 10. Some of the perfectly water soluble raw materials 5 are solubilised in water, obtaining the flow 6. The flows 3 and 6 are mixed together and the rest of the perfectly water soluble raw materials 8 are added thereto in order to integrate the solution with the required elements.

The addition of the integrating elements 8 can be carried out directly also in the flow 3 or in the flow 6 in a separate manner, before the total mixing of the various flows, guaranteeing in all cases the perfect solubilisation of said elements in the solution.

Alternatively one or more fully soluble salts containing nutrients (meso and/or micro elements) and/or one or more fully soluble salts containing the fertilising elements N, P, K, instead of being subjected to a prior solubilisation, are dissolved directly, partly during the solubilisation phase a) and partly solubilised in the solution obtained after the separation phase b).

Alternatively one or more fully soluble salts containing nutrients (meso and/or micro elements) and/or one or more fully soluble salts containing the fertilising elements N, P, K, instead of being subjected to a previous solubilisation, are dissolved directly in the solution 3 obtained after separating the solids.

Alternatively one or more fully soluble salts containing nutrients (meso and/or micro elements) and/or one or more fully soluble salts containing the fertilising elements N, P, K, are divided into three flows, a first flow is added to the solubilisation phase a), a second flow is added to the solubilisation phase a'), and a third flow is solubilised directly in the solution obtained from phase b).

What is claimed is:

1. A method for preparing a water soluble fertilizer in the form of trill comprising nitrogen, phosphorus and potassium, comprising:

a. solubilisation in water of salts containing the fertilising elements of nitrogen, phosphorus and potassium to form a first solution, said solution comprising a fraction of non soluble solids in suspension;

b. separation from said solution of the fraction of non soluble solids in suspension, thus obtaining a solution free of solids in suspension having a water content not exceeding 80% by weight;

c. concentrating the solution free of solids in suspension until obtaining a solution of molten salts having a water content not exceeding 5% by weight; and d. cooling the solution of salt having a water content not exceeding 5% by weight until obtaining prills.

2. The method as claimed in claim 1, wherein the nitrogen salt is ammonium nitrate.

3. The method as claimed in claim 1, wherein the phosphorus salt is mono-ammonium phosphate.

4. The method as claimed in claim 1, wherein the potassium salt is potassium nitrate.

5. The method as claimed in claim 1, wherein during said solubilisation one or more soluble salts selected from the group consisting of salts of S, Ca, Mg, Fe, Mn, Zn, Cu, B and Mo are also dissolved.

6. The method as claimed in claim 1, wherein during said solubilisation one or more soluble salts selected from the group consisting of salts of nitrogen, phosphor and potassium are also dissolved.

7. The method as claimed in claim 1, further comprising another solubilisation during which one or more soluble salts selected from the group consisting of salts of S, Ca, Mg, Fe, Mn, Zn, Cu, B and Mo are dissolved to provide a second solution, and mixing together the first and second solutions before said concentration.

8. The method as claimed in claim 1, further comprising another solubilisation during which one or more soluble salts selected from the group consisting of salts of nitrogen, phosphorus and potassium are dissolved to provide a second solution, and mixing together the first and second solutions before said concentration.

9. The method as claimed in claim 1, wherein during said solubilisation a first portion of one or more soluble salts selected from the group consisting of salts of S, Ca, Mg, Fe, Mn, Zn, Cu, B and Mo is dissolved, while a second portion of said soluble salts is dissolved during a second solubilisation said solutions obtained respectively therefrom then being mixed together before the concentration.

10. The method as claimed in claim 1, wherein during said solubilisation a first portion of one or more soluble salts selected from the group consisting of salts of a nitrogen, phosphorus and potassium is dissolved, while a second portion of said soluble salts is dissolved during a second solubilisation, said solutions obtained respectively therefrom then being mixed together before said concentration.

11. The method as claimed in claim 1, wherein after said separation, one or more soluble salts selected from the group consisting of salts of S, Ca, Mg, Fe, Mn, Zn, Cu, B and Mo are dissolved directly in said solution free of solids in suspension.

12. The method as claimed in claim 1, wherein after said separation, one or more soluble salts selected from the group consisting of salts of nitrogen, phosphorus and potassium are dissolved directly in said solution free of solids in suspension.

13. The method as claimed in claim 1, wherein one or more soluble salts selected from the group consisting of salts of S, Ca, Mg, Fe, Mn, Zn, Cu, B and Mo, are in part dissolved during said solubilisation and in part solubilised in said solution free of solids in suspension after the separation.

14. The method as claimed in claim 1, wherein one or more soluble salts selected from the group consisting of salts of nitrogen, phosphorus and potassium, are in part dissolved during said solubilisation and in part solubilised after the separation in said solution free of solids in suspension.

15. The method as claimed in claim 1, wherein one or more soluble salts selected from the group consisting of salts of S, Ca, Mg, Fe, Mn, Zn, Cu, B and Mo are divided into first, second and third flows, and said first flow is added during said solubilisation, the second flow is dissolved separately and added after said solubilisation, and the third flow is solubilised directly to said solution free of solids in suspension.

16. A method as claimed in claim 1, wherein one or more soluble salts selected from the group consisting of salts of nitrogen, phosphorus and potassium are divided into first, second and third flows, and said first flow is added during said solubilisation, the second flow is dissolved separately and added after said solubilisation, and the third flow is solubilised directly to said solution free of solids in suspension.

17. A water soluble NPK fertiliser in the form of prill having a solubility in water of at least 99% by weight and a prill diameter lower than 4 mm.

18. A water soluble fertilizer in the form of prills made by the method of claim 5, and having a solubility in water of at least 99% by weight with a prill diameter less than 4 mm.

19. A water soluble fertilizer in the form of prills made by the method of claim 6, and having a solubility in water of at least 99% by weight with a prill diameter less than 4 mm.

20. A water soluble fertilizer in the form of prills made by the method of claim 7, and having a solubility in water of at least 99% by weight with a prill diameter less than 4 mm.

21. A water soluble fertilizer in the form of prills made by the method of claim 8, and having a solubility in water of at least 99% by weight with a prill diameter less than 4 mm.

22. A water soluble fertilizer in the form of prills made by the method of claim 9, and having a solubility in water of at least 99% by weight with a prill diameter less than 4 mm.

23. A water soluble fertilizer in the form of prills made by the method of claim 10, and having a solubility in water of at least 99% by weight with a prill diameter less than 4 mm.

* * * * *